US012219906B2

(12) United States Patent
Iizuka et al.

(10) Patent No.: US 12,219,906 B2
(45) Date of Patent: Feb. 11, 2025

(54) CULTIVATION ASSISTING DEVICE AND CULTIVATION ASSISTING METHOD

(71) Applicant: AQUASOLUTION CORPORATION, Nagano (JP)

(72) Inventors: Masaaki Iizuka, Tokyo (JP); Yuichi Okuyama, Tokyo (JP)

(73) Assignee: AQUASOLUTION CORPORATION, Nagano (JP)

( * ) Notice: Subject to any disclaimer, the term of this patent is extended or adjusted under 35 U.S.C. 154(b) by 431 days.

(21) Appl. No.: 17/611,408

(22) PCT Filed: Mar. 23, 2020

(86) PCT No.: PCT/JP2020/012689
§ 371 (c)(1),
(2) Date: Nov. 15, 2021

(87) PCT Pub. No.: WO2020/241005
PCT Pub. Date: Dec. 3, 2020

(65) Prior Publication Data
US 2022/0240465 A1    Aug. 4, 2022

(30) Foreign Application Priority Data

May 30, 2019  (JP) ................................. 2019-101050
Jan. 30, 2020  (JP) ................................. 2020-013568

(51) Int. Cl.
*A01G 31/02*        (2006.01)
*G06Q 50/02*       (2012.01)

(52) U.S. Cl.
CPC ............. *A01G 31/02* (2013.01); *G06Q 50/02* (2013.01)

(58) Field of Classification Search
CPC ...... A01G 31/02; A01G 27/003; A01G 25/02; A01G 25/00; A01G 25/06; A01G 7/00;
(Continued)

(56) References Cited

U.S. PATENT DOCUMENTS 10,986,789 B1 *  4/2021  Roberts ................... A01G 9/26
2016/0371830 A1  12/2016  Barrasso et al.
(Continued)

FOREIGN PATENT DOCUMENTS

CN  108862809 A    11/2018
EP  3 550 498 A1   10/2019
(Continued)

OTHER PUBLICATIONS

Extended European Search Report issued in corresponding European Patent Application No. 20813889.1-1105, dated Jul. 4, 2022.
(Continued)

*Primary Examiner* — Jeffrey R Larsen
(74) *Attorney, Agent, or Firm* — Rimon P.C.

(57) ABSTRACT

Provided are a cultivation assisting device and a cultivation assisting method which are capable of assisting cultivators in cultivating crops using nanobubble water effectively. In order to assist cultivation of crops using nanobubble water, first information relating to a nanobubble water use condition is acquired for each cultivator cultivating a crop and second information relating to the result of cultivation is acquired for each cultivator; from the first information and second information of each cultivator, the correlation between the use condition and the result is determined; a selection of a result is accepted; and a use condition based on the selected result is derived on the basis of the correlation.

15 Claims, 6 Drawing Sheets

(58) Field of Classification Search
CPC ........ G06Q 50/02; G06Q 10/04; Y02A 20/00; B01F 23/23; B01F 23/20; B01F 23/231; B01F 23/2373; B01F 23/2375; B01F 23/2326; G06T 2207/30188; G06T 2207/20081; G06N 20/00; G06N 3/08
See application file for complete search history.

(56) References Cited

U.S. PATENT DOCUMENTS

| | | | | |
|---|---|---|---|---|
| 2017/0340991 | A1* | 11/2017 | Kobayashi | B01D 43/00 |
| 2019/0050948 | A1 | 2/2019 | Perry et al. | |
| 2019/0124853 | A1* | 5/2019 | Serizawa | A01G 24/20 |
| 2019/0333214 | A1 | 10/2019 | Haneda et al. | |

FOREIGN PATENT DOCUMENTS

| | | |
|---|---|---|
| JP | 2009-296940 A | 12/2009 |
| JP | 2011-050293 A | 3/2011 |
| JP | 2012-083986 A | 4/2012 |
| JP | 2018-108041 A | 7/2018 |
| KR | 10-2019-0046841 A | 5/2019 |
| WO | 2017/104841 A1 | 6/2017 |
| WO | 2018/123630 A1 | 7/2018 |

OTHER PUBLICATIONS

African Office Action issued in corresponding African Patent Application No. AP/P/2021/013621, dated Apr. 14, 2023.

India Office Action issued in corresponding India Patent Application No. 202117053312, dated Apr. 25, 2022.

Hearing Notice issued to the corresponding Indian Patent Application No. 202117053312 on Jan. 17, 2024.

International Search Report issued in corresponding International Patent Application No. PCT/JP2020/012689, dated Jun. 16, 2020, with English translation.

* cited by examiner

ANSWER OUTCOME YOU PLACE IMPORTANCE
AND ITS WEIGHT (MULTIPLE ANSWERS ALLOWED)

| OUTCOME | WEIGHT (0~100) |
|---|---|
| SUGAR CONTENT OF HARVEST | 80 |
| YIELD | 20 |

CULTIVATION ASSISTING DEVICE AND CULTIVATION ASSISTING METHOD

CROSS REFERENCE TO RELATED APPLICATIONS

This application is the U.S. National Phase under 35 U.S.C. § 371 of International Application No. PCT/JP2020/012689, filed on Mar. 23, 2020, which claims the benefit of Japanese Application No. 2019-101050, filed on May 30, 2019 and Japanese Application No. 2020-013568, filed on Jan. 30, 2020, the entire contents of each are hereby incorporated by reference.

TECHNICAL FIELD

The present invention relates to a cultivation assisting device and a cultivation assisting method.

BACKGROUND ART

Agriculture is attracting attention in recent years, and the number of new farmers remains on the rise. However, it is difficult to cultivate a crop plant in general, and particularly in the case of beginners, they lack experience and the like, so that good outcomes of cultivation are hardly obtained. In addition, conventional agriculture has relied on feeling, experience, intuition and the like of farmers in many aspects, which made cultivation of a crop plant further difficult.

From the foregoing circumstances, techniques to assist in cultivation of a crop plant have been developed. For instance, there is already present a technique in which data on conditions for and outcomes of cultivation is accumulated, and by using the accumulated data, cultivation conditions that would result in good outcomes are proposed to a grower (assistance target).

This is described with one example. A technique described in Patent Literature 1 is an information processing device that assists in cultivating plants. With this device, it is possible to acquire cultivation information representing a state of each plant cultivated by each of a plurality of users, generate or update a growth model optimal for each environment in which the relevant plant is placed on the basis of the cultivation information acquired, and generate cultivation assistance information used as assistance when an assistance target user cultivates a plant on the basis of the cultivation information representing the state of the plant cultivated by the assistance target user and the growth model (for example, see claim 1 of Patent Literature 1). With this, even a beginner can cultivate plants well.

A technique described in Patent Literature 2 is a growth support system that supports the growth of living subjects. With this system, it is possible to store information representing a growth state in a storing means, evaluate the growth state, acquire information representing the state of present growth, extract, from the storing means, information representing a growth state that has been evaluated as being superior to the state of present growth as the information for comparison, and compares the extracted information for comparison with the information representing the state of present growth to thereby create support information directed to a user who is performing the present growth (for example, see claim 1 of Patent Literature 2). This makes it possible to improve the quality of advices provided to users in relation to the growth of living subjects.

CITATION LIST

Patent Literature

Patent Literature 1: WO 2017/104841
Patent Literature 2: JP 2012-83986 A

SUMMARY OF INVENTION

Technical Problems

Meanwhile, effects of nanobubble water in cultivation of a crop plant have already been known; for instance, the use of nanobubble water accelerates the growth of a crop plant. However, a condition allowing effects of nanobubble water to be advantageously exhibited varies depending on the kind of a crop plant cultivated, the environment and other factors, and therefore, usually becomes clear after the cultivation using nanobubble water is actually performed and experience is accumulated. Accordingly, it is difficult for beginners with little experience to effectively use nanobubble water in cultivation of a crop plant.

In view of the foregoing circumstances, it is required to convert the influence of a nanobubble water use condition on an outcome of cultivation of a crop plant into data (i.e., visualize that influence) and effectively utilize the thus obtained information. That is, it may be desired that information on a nanobubble water use condition and information on a cultivation outcome are acquired as one set and utilized to cultivate a crop plant with effective use of nanobubble water.

In contrast, Patent Literatures stated above do not mention acquiring information on a nanobubble water use condition at all, although they describe acquiring information on a cultivation environment including the location and the climate and information on the types of things that influence cultivation (specifically, the types of work of a grower, a tool to be used, a fertilizer and a chemical, and the like). Thus, even when the techniques described in Patent Literatures stated above are used, the cultivation of a crop plant with effective use of nanobubble water is not necessarily possible.

The present invention has been made in view of the above circumstances and aims at achieving the following object. That is, an object of the present invention is to solve the problems of the conventional art as above and to provide a cultivation assisting device and a cultivation assisting method that are capable of assisting a grower such that the grower can cultivate a crop plant with effective use of nanobubble water.

Solution to Problems

In order to attain the foregoing object, the present invention provides a cultivation assisting device assisting in cultivation of a crop plant using nanobubble water, the device comprising: a first information acquiring section configured to acquire first information related to a use condition of the nanobubble water for each grower of the crop plant; a second information acquiring section configured to acquire second information related to an outcome of the cultivation for the each grower; a correspondence identifying section configured to identify a correspondence between the use condition and the outcome based on the first information and the second information of the each grower; a designation accepting section configured to accept designation of the outcome; and a condition deriving section configured to derive the use condition corresponding to the outcome designated, based on the correspondence.

With the cultivation assisting device of the invention configured as above, it is possible to acquire information related to a nanobubble water use condition at the time when a grower has cultivated a crop plant using nanobubble water and information on a cultivation outcome resulting therefrom, and derive a use condition corresponding to an outcome designated by a grower based on the information. Thus, a grower can appropriately use nanobubble water such that a cultivation outcome on which the grower places importance can have a favorable content regardless of the amount of the grower's experience.

In the cultivation assisting device of the invention, preferably, the correspondence identifying section identifies the correspondence by performing machine learning using the first information and the second information of the each grower.

With the foregoing configuration, by performing machine learning using the first information and the second information, a correspondence between a nanobubble water use condition and a cultivation outcome can be appropriately identified.

In the cultivation assisting device of the invention, preferably, the designation accepting section accepts designation of each of a plurality of the outcomes set from different points of view, along with a weight set for each of the plurality of the outcomes, and the condition deriving section derives the use condition corresponding to the plurality of the outcomes designated, in such a manner that an outcome set with a larger weight is prioritized.

The foregoing configuration makes it possible to derive a nanobubble water use condition that allows each of designated plural cultivation outcomes to have a content corresponding to the associated weight.

In the cultivation assisting device of the invention, preferably, the first information is information representing at least one of following: time to use the nanobubble water; an amount of use of the nanobubble water per use; a frequency of use of the nanobubble water; the number of bubbles contained in the nanobubble water per unit volume; a particle size of the bubbles; a type of gas constituting the bubbles; a zeta potential of the bubbles; a condition for operation of an apparatus used to generate the nanobubble water; and a state and a feature value of raw water of the nanobubble water.

The foregoing types of information are appropriate as the first information related to a nanobubble water use condition.

In the cultivation assisting device of the invention, preferably, the second information is information representing at least one of following: a property of a harvested product of the crop plant; yield of the harvested product; harvesting time of the harvested product; and the state of a portion other than the harvested product in the crop plant.

The foregoing types of information are appropriate as the second information related to a cultivation outcome.

In the cultivation assisting device of the invention, preferably, the second information includes at least one of information representing a feature value of the crop plant measured with a sensor at a cultivation site of the crop plant, information representing a feature value of a taken part measured with respect to the taken part taken from the crop plant, language information representing a content of the outcome expressed by a grower, and image information of the crop plant.

With the foregoing configuration, the second information can be acquired through various acquisition paths.

Preferably, the cultivation assisting device of the invention comprises a third information acquiring section configured to acquire third information for the each grower, the third information being related to a cultivation condition for the crop plant other than the use condition, wherein the correspondence identifying section identifies a correspondence between a set of the use condition and the cultivation condition, and the outcome, based on the first information, the second information and the third information of the each grower, and when the designation accepting section accepts designation of the outcome, the condition deriving section derives the use condition corresponding to the cultivation condition represented by the third information of a grower that performed designation of the outcome and also corresponding to the outcome designated, based on the correspondence.

The foregoing configuration makes it possible to derive a nanobubble water use condition corresponding to an outcome designated by a grower while a cultivation condition other than the use condition is taken into consideration.

More preferably, the cultivation assisting device of the invention further comprises a fourth information acquiring section configured to acquire fourth information related to a state of growth of the crop plant during a cultivation period for the each grower, wherein the correspondence identifying section identifies a primary correspondence between the set of the use condition and the cultivation condition, and the state of growth of the crop plant during the cultivation period, based on the first information, the third information and the fourth information of the each grower, and a secondary correspondence between the state of growth of the crop plant during the cultivation period and the outcome based on the second information and the fourth information of the each grower, thus identifying the correspondence including the primary correspondence and the secondary correspondence.

With the foregoing configuration, a primary correspondence between the set of a nanobubble water use condition and a cultivation condition, and the state of growth of a crop plant during a cultivation period, and a secondary correspondence between the state of growth of the crop plant during the cultivation period and a cultivation outcome are identified. This makes it possible to finely identify a correspondence between each influential factor on a cultivation outcome and the cultivation outcome; accordingly, also for a nanobubble water use condition to be derived based on the correspondence, a more suitable condition is derived.

In the cultivation assisting device of the invention, preferably, the fourth information includes at least one of information representing a feature value of the crop plant measured with a sensor at a cultivation site of the crop plant, information representing a feature value of a taken part measured with respect to the taken part taken from the crop plant, language information representing the state of growth of the crop plant expressed by the grower, and image information of the crop plant.

With the foregoing configuration, the fourth information can be acquired through various acquisition paths.

In the cultivation assisting device of the invention, preferably, the fourth information acquiring section acquires the fourth information plural times at different acquisition times during the cultivation period during which a same grower cultivates a same kind of a crop plant, and the correspondence identifying section identifies the primary correspondence between the set of the use condition and the cultivation condition, and temporal change of the state of growth of the crop plant identified based on the fourth information acquired plural times during the cultivation period, and the secondary correspondence between the temporal change and the outcome.

The foregoing configuration makes it possible to identify a correspondence between temporal change of the state of growth of a crop plant during a cultivation period and the final cultivation outcome of the crop plant.

Preferably, the cultivation assisting device of the invention further comprises: an outcome predicting section configured to predict the outcome of the crop plant cultivated by a subject grower based on the fourth information related to the crop plant cultivated by the subject grower and the secondary correspondence; and a warning generating section configured to issue a warning to the subject grower when a content of the outcome predicted by the outcome predicting section does not satisfy a standard having been set in advance.

The foregoing configuration makes it possible to predict that the current way of cultivation will not lead to a preferable content of a cultivation outcome and call the grower's attention in response to the prediction result, thus assisting a grower such that the grower can cultivate a crop plant more appropriately.

In the cultivation assisting device of the invention, preferably, the designation accepting section accepts the designation of the outcome by receiving data that represents the outcome designated by a grower by use of a communication terminal and that is sent from the communication terminal operated by the grower, and the cultivation assisting device further comprises a condition outputting section configured to output the use condition derived by the condition deriving section to the communication terminal.

The foregoing configuration allows a grower to designate a cultivation outcome with the grower's communication terminal and check a nanobubble water use condition corresponding to the designated outcome with the grower's communication terminal.

In the cultivation assisting device of the invention, more preferably, the condition outputting section sends data used to present, to the grower, the use condition derived by the condition deriving section and a content of the outcome to be obtained under the use condition derived by the condition deriving section, to the communication terminal.

The foregoing configuration allows a grower to check, along with a nanobubble water use condition corresponding to the designated outcome, a content of the outcome to be obtained under the use condition, thereby more appropriately cultivating a crop plant (while expecting the content of the cultivation outcome).

In the cultivation assisting device of the invention, preferably, the designation accepting section accepts the designation of the outcome by acquiring language information representing the outcome designated by a grower.

The foregoing configuration makes it possible to accept the designation of a cultivation outcome by acquiring language information representing the outcome.

In order to attain the foregoing object, the present invention provides a cultivation assisting method assisting in cultivation of a crop plant using nanobubble water by use of a computer, the method comprising: a step of, by a computer, acquiring first information related to a use condition of the nanobubble water for each grower of the crop plant; a step of, by a computer, acquiring second information related to an outcome of the cultivation for the each grower; a step of, by a computer, identifying a correspondence between the use condition and the outcome based on the first information and the second information of the each grower; a step of, by a computer, accepting designation of the outcome; and a step of, by a computer, deriving the use condition corresponding to the outcome designated based on the correspondence.

The foregoing configuration makes it possible to assist a grower such that the grower can cultivate a crop plant with effective use of nanobubble water.

Advantageous Effects of Invention

The present invention makes it possible to provide a cultivation assisting device and a cultivation assisting method that are capable of assisting a grower such that the grower can cultivate a crop plant with effective use of nanobubble water.

DESCRIPTION OF EMBODIMENTS

The invention is described below by reference to a preferred embodiment (hereinafter called "the embodiment") illustrated in the appended drawings.

Note that the embodiment is one specific embodiment used to describe the invention in an obvious manner, and the invention is by no means limited to the embodiment. In other words, the invention may be modified or improved without departing from the scope and spirit of the invention, and needless to say, the invention includes its equivalents.

Figure 8:
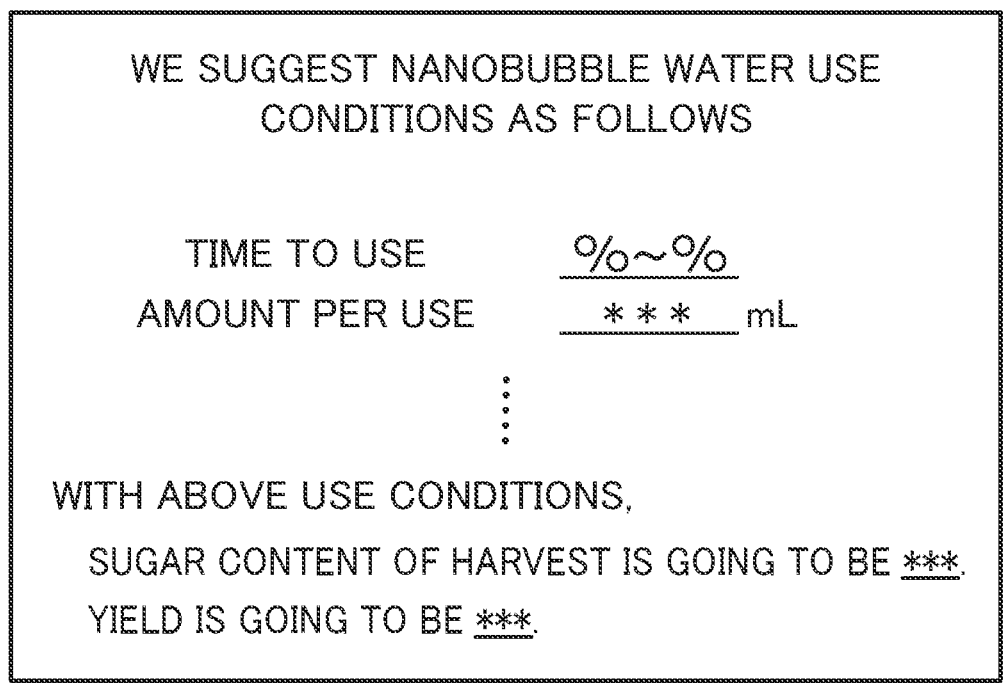
FIG. 8 is a view showing an example of a plan presentation screen.

Examples of screens (specifically, the screens shown in FIGS. 7 and 8) described below are merely examples, and the design and the configuration of a screen, displayed contents, and other factors can be freely designed and changed in accordance with the user's preference, the specification of the screen and the like.

In this description, the term "device" or "apparatus" comprises one that may be treated as a unit with its components being stored in a casing, and the term may also comprise one with its components being disposed separately in an independent manner but regarded as one unit because the components cooperate together to achieve a specific objective.

The term "crop plant" may comprise a single crop plant cultivated or a plurality of crop plants of the same variety that are cultivated at the same location and in the same period of time; in the present invention, the latter is meant unless otherwise noted.

<<Regarding Crop Plant Cultivation Using Nanobubble Water>>

To describe a cultivation assisting device according to the embodiment, crop plant cultivation using nanobubble water is described. A grower that is an assistance target of the cultivation assisting device according to the embodiment cultivates a crop plant using nanobubble water.

The term "nanobubble water" refers to water that contains bubbles having a diameter of less than 1 μm, more precisely, water in which nanobubbles are incorporated. The expression "water in which nanobubbles are incorporated" refers to, for instance, water into which nanobubbles have been artificially incorporated by a nanobubble water generating apparatus 100 to be described later, and water inevitably containing nanobubbles due to its original properties or the like is excluded from the "water in which nanobubbles are incorporated." Water (raw water) used to generate nanobubble water is not particularly limited, and use can be made of, for example, rainwater, tap water, well water, surface water, agricultural water and distilled water.

Nanobubble water is known to provide favorable effects in crop plant cultivation, such as accelerating the growth of plants and minimizing damage of plants caused by diseases or pests, and is used for the purpose of obtaining such effects.

Exemplary methods of generating nanobubble water include a static mixer method, a venturi method, a cavitation method, a vapor condensation method, an ultrasonic method, a swirling flow method, a pressurized dissolution method, and a fine pore method. While any of those generation methods may be used, in the embodiment, a grower U uses the nanobubble water generating apparatus 100 that generates nanobubbles in raw water by the pressurized dissolution method.

Figure 1:
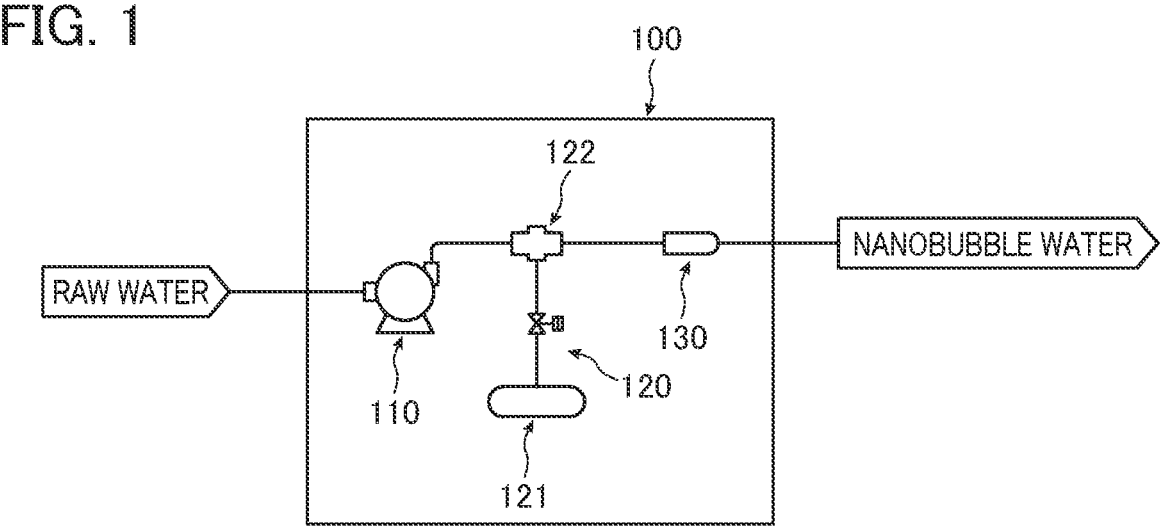
FIG. 1 is a conceptual view of a nanobubble water generating apparatus.

FIG. 1 is a conceptual view of the nanobubble water generating apparatus 100. As shown in FIG. 1, the nanobubble water generating apparatus 100 includes a liquid discharger 110 that discharges water, a gas incorporating device 120 that pressurizes gas and incorporates the gas into the water discharged from the liquid discharger 110, and an ultrafine bubble generator 130 that allows the water having the gas incorporated therein to pass through an inside of the ultrafine bubble generator 130 to generate ultrafine bubbles in the water.

The liquid discharger 110 is for example a pump that takes in and discharges raw water. The gas incorporating device 120 includes a vessel 121 in which compressed gas is enclosed and a gas incorporating device body 122 of substantially cylindrical shape. Water discharged from the liquid discharger 110 flows into the inside of the gas incorporating device body 122, and compressed gas in the vessel 121 is further introduced into the gas incorporating device body 122. Consequently, gas-incorporated water is generated in the gas incorporating device body 122.

The type of the compressed gas is not particularly limited but is preferably a gas other than hydrogen from the view point of a longtime existence in water. Specific examples of the gas include air, oxygen, nitrogen, fluorine, carbon dioxide, and ozone.

The ultrafine bubble generator 130 generates nanobubbles in the gas-incorporated water flowing the inside thereof and is specifically a nanobubble generating nozzle adopting the structure described in JP 2018-15715 A. Nanobubble water generated in this nozzle is ejected from a tip end of the nozzle, then flows out the nanobubble water generating apparatus 100, and is delivered to a specified destination via a flow channel which is not shown.

As described above, between the liquid discharger 110 and the ultrafine bubble generator 130 in the nanobubble water generating apparatus 100, the gas incorporating device 120 incorporates compressed gas into water (raw water) being in a pressurized state and flowing toward the ultrafine bubble generator 130. Owing to this configuration, defects such as cavitation that may occur when gas is incorporated into water on the intake side (suction side) of the liquid discharger 110 can be avoided. Besides, since compressed gas (i.e., pressurized gas) is incorporated into water, gas can be incorporated into water against the water pressure at the place where the gas is incorporated. Accordingly, gas can be appropriately incorporated into water without particularly generating a negative pressure at the place where the gas is incorporated.

The flow channel of nanobubble water may be a channel extending only toward the destination of the nanobubble water (i.e., single-path channel) or a channel branched into two paths, one of which serves as a return line to the liquid discharger 110 (i.e., a flow channel for circulation use). The liquid discharger 110 may be directly connected to a flow channel of water (raw water) flowing from a water source, and alternatively, a water storage tank or a water reservoir may be placed between a flow channel of raw water and the liquid discharger 110.

A mode of use of nanobubble water is not particularly limited, and one example thereof is a mode where nanobubble water is sprinkled (or irrigated in the case of nutrient-solution soil culture). In this case, nanobubble water may be sprayed over the whole or a part of a crop plant, or may be sprayed over soil in which a crop plant is planted. Examples off other modes of applying nanobubble water include a mode where a culture solution generated using nanobubble water is supplied, a mode where a fertilizer fermented using nanobubble water is sprinkled to soil, a mode where a liquid fertilizer diluted with nanobubble water is poured or applied onto a crop plant, and a mode where an agrochemical diluted with nanobubble water is sprayed.

<<Summary of Cultivation Assisting System>>

Figure 2:
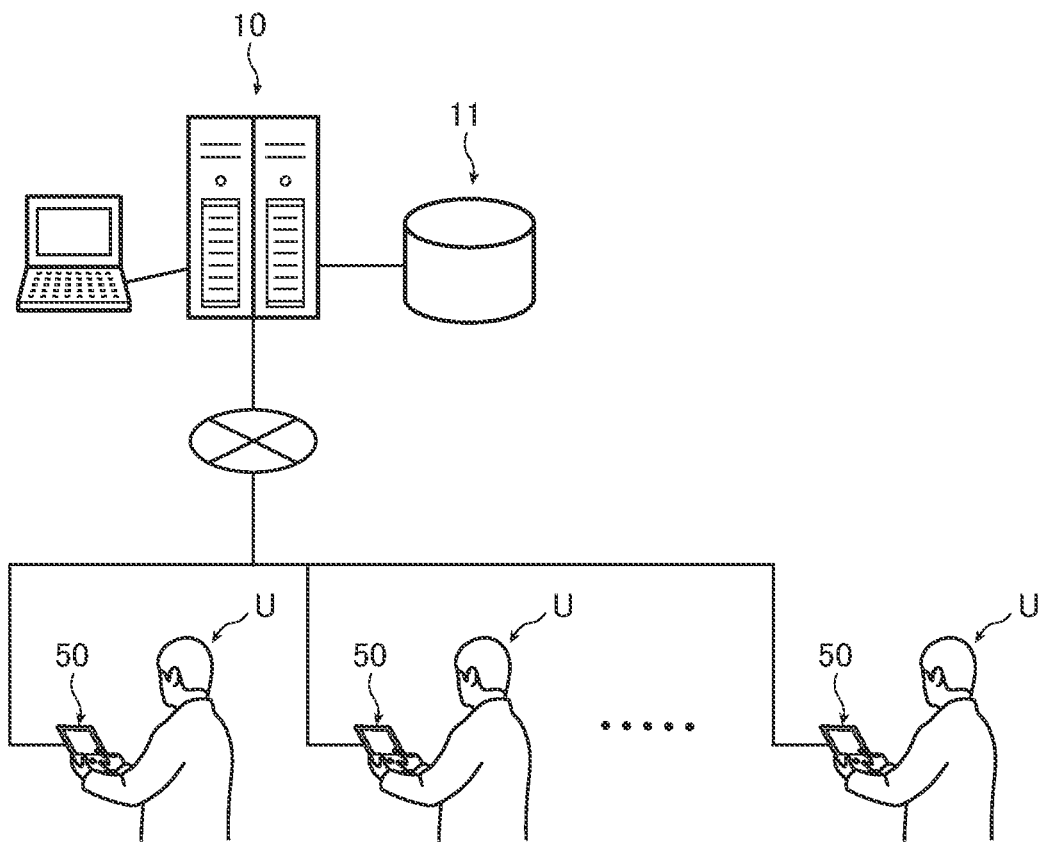
FIG. 2 is a view showing the configuration of a cultivation assisting system.

Next, a cultivation assisting system (hereinafter called "cultivation assisting system S") including the cultivation assisting device according to the embodiment is described with reference to FIG. 2. FIG. 2 is a view showing the configuration of the cultivation assisting system S.

The cultivation assisting system S is a system used to assist the grower U that cultivates a crop plant using nanobubble water. For the grower U, a single person is basically intended; however, a group or an organization comprised of a plurality of persons may be regarded as the grower U, and alternatively, a village or a community may be included in the grower U. A limitation may be set on the grower U that is an assistance target, and for instance, the grower U may be limited to one using the foregoing nanobubble water generating apparatus 100. Alternatively, no limitation may be set on the grower U that is an assistance target.

As shown in FIG, 2, the cultivation assisting system S is composed of a cultivation assisting device (hereinafter called "cultivation assisting device 10") and communication terminals 50 of growers U. The cultivation assisting device 10 is a server computer (one example of a computer) operated by a service providing company providing a cultivation assistance service and is capable of communicating with the communication terminals 50 of the growers U via the Internet or a mobile communication network. Each communication terminal 50 is a device that the associated grower U operates to use the cultivation assistance service and is constituted of any of a personal computer, a tablet-type terminal, a smartphone, a mobile phone, and other devices having the communication function.

The cultivation assisting device 10 acquires past cultivation information and current cultivation information for each grower, stores the acquired cultivation information in association with identification information (e.g., user ID) of the grower, and accumulates the information in the form of a database. For a grower that cultivates various kinds of crop plants, cultivation information is acquired for each kind of crop plant, stored in association with identification information (e.g., classification code) of the kind, and accumulated. Here, the term "kind" is a concept covering the name of an item (the name of a kind) as a large classification and a variety as a small classification.

In the embodiment, cultivation information includes first information related to a nanobubble water use condition, second information related to a cultivation outcome, third information related to a cultivation condition other than the nanobubble water use condition, and fourth information representing the state of growth of a crop plant during a cultivation period.

The first information is information representing at least one of, for instance, the time to use nanobubble water, the amount of use of nanobubble water per use, the frequency of use of nanobubble water, the number of bubbles contained in nanobubble water per unit volume, the particle size of bubbles (more precisely, the modal particle size), the type of gas constituting bubbles, the zeta potential of bubbles, a condition for operation of the nanobubble water generating apparatus 100 (e.g., the pressure of compressed gas to be incorporated into water by the gas incorporating device 120, and supply pressure of nanobubble water), and the state and a feature value of raw water of nanobubble water (e.g., the temperature of raw water, the pH value, the concentration of dissolved oxygen, the electrical conductivity, the biochemical oxygen demand, the chemical oxygen demand, the amount of suspended solids, the redox potential, the total amount of nitrogen, the total amount of phosphorus, the amount of zinc).

Information (e.g., the temperature of nanobubble water, and the dilution ratio when a liquid fertilizer or an agrochemical is diluted with nanobubble water) other than the foregoing items may be included in the first information as long as it is related to a nanobubble water use condition.

The second information is information representing at least one of, for instance, the properties of a harvested product of a crop plant, the yield of a harvested product, the harvesting time of a harvested product, and the state of other portions than a harvested product in a crop plant.

The properties herein refer to the quality, the size, the length, the weight, the hardness, the presence or absence of damage caused by diseases or pests, and the like of a harvested product. The quality includes the quality evaluated based on the appearance, such as the shape, the color, the gloss, and the presence or absence of a blemish, the quality evaluated based on contained components, such as the sugar content (ripeness) and the acidity, and the quality evaluated based on human's sensibilities, such as the texture and the deliciousness.

Examples of the state of other portions than a harvested product include the height, the degree of withering, the presence or absence of damage caused by diseases or pests, and the like of a stem; the number, the shape, the size, the degree of withering, the water content, the presence or absence of damage caused by diseases or pests, and the like of leaves; the height, the thickness, the number of branches, the degree of withering, the presence or absence of damage caused by diseases or pests, and the like of a trunk; the degree of rooting, the degree of root rot, and the like.

Information. (e.g., a fertilizer used in cultivation, or the amount of reduction of an agrochemical) other than the foregoing items may be included in the second information as long as it is related to a cultivation outcome.

The third information represents, for instance, specific details, numerical values or the like of a cultivation condition that affects the cultivation of a crop plant except for nanobubble water during a cultivation period. The third information includes, for instance, a cultivation region of a crop plant, the climate, the amount of precipitation and the amount of insolation of a cultivation region, the air temperature, the temperature at a growth point, the humidity, the humidity deficit, the cultivation season, the cultivation method, the types of fertilizer and agrochemical for use in cultivation, the frequency of use of a fertilizer and an agrochemical, the cultivation area, the number of crop plants per unit area (density), the state of soil or culture medium (specifically, the temperature in soil, the water content, pH, the electrical conductivity, the amount of nitrogen, the amount of nitrate nitrogen, the amount of ammonia nitrogen, the amount of phosphoric acid, the amount of potassium, the amount of lime, the amount of magnesium, the ratio of lime/magnesium, the ratio of magnesium/potassium, and the like), the state of water for use in the case of hydroponic culture (specifically, the water temperature, pH, the electrical conductivity, the amount of dissolved oxygen, and the like), the state of a nutrient solution and a waste solution in the case of nutrient solution culture (specifically, the solution temperature, pH, the electrical conductivity, the amount of dissolved oxygen, and the like), and the environment in a greenhouse in the case of greenhouse cultivation (specifically, the temperature, the humidity, the concentration of carbon dioxide, and the like).

Information (e.g., the proficiency of a grower) other than the foregoing items may be included in the third information as lone as it is related to a cultivation condition that affects the cultivation of a crop plant.

The fourth information includes a numerical value, language (text), or image information representing the state of growth of a crop plant in the middle of cultivation. Examples of the state of growth represented by the fourth information include the shape, the appearance, the size, the presence or absence of gloss, and the degree of coloring of each portion of a crop plant during a cultivation period, the presence or absence of damage caused by diseases or pests and the degree of the damage, the degree of withering, the degree of root rot, the degree of root taking, the presence or absence of flowering and the number of flowers in bloom, the number of leaves, the height of a plant, the height of a stem or a trunk, the presence or absence of fruit bearing and the number of fruits, the water content and the component content of a specified portion (e.g., a leaf) in a crop plant, the amount of transpiration, the amount of photosynthesis, a response to the meteorological environment, and the like.

The fourth information representing the state of growth (e.g., the state of fertilization management such as the degree of effectiveness of a fertilizer and an agrochemical) other than the foregoing items may be acquired as long as it is information representing the state of growth of a crop plant in the middle of cultivation.

While in the embodiment, the foregoing four types of information are acquired as the cultivation information, it suffices if at least the first information and the second information are acquired, and the remaining information need not be acquired. Other than the foregoing four types of information, information on basic agricultural knowledge (including the explanation on agricultural terms) and information on the history of occurrence of abnormalities including machine troubles.

The cultivation assisting device 10 performs machine learning using accumulated cultivation information and constructs a mathematical model representing a correspondence between a cultivation implementation condition and a cultivation outcome (hereinafter called "cultivation assistance model"). The cultivation implementation condition herein includes a nanobubble water use condition and a cultivation condition other than the nanobubble water use condition (hereinafter simply called "cultivation condition"). Examples of the nanobubble water use condition include, as described above, the time to use nanobubble water, the amount of use of nanobubble water per use, the frequency of use of nanobubble water, the number of bubbles contained in nanobubble water per unit volume, the particle size of bubbles, the type of gas constituting bubbles, the zeta potential of bubbles, conditions for operation of the nanobubble water generating apparatus 100, the temperature of nanobubble water, and the dilution ratio when a liquid fertilizer or an agrochemical is diluted with nanobubble water.

The cultivation assisting device 10 can predict a content of a cultivation outcome to be obtained under a certain cultivation implementation condition and derive the nanobubble water use condition that allows a certain cultivation outcome to have the most favorable content, by use of the cultivation assistance model. The "content of a cultivation outcome" refers to the state, a numerical value, the grower U's impression, the evaluation that a demander (e.g., a consumer and a dealer) of a harvested product makes, or the like that is obtained as the final result of cultivation of a crop plant.

The grower U can use the foregoing functions included in the cultivation assisting device 10 through the grower's own communication terminal 50. To be more specific, in cultivation of a crop plant A, when one grower U designates an outcome (e.g., the yield) on which the grower places importance in that cultivation, data representing the designation result is sent to the cultivation assisting device 10 from the communication terminal 50 of the one grower U. Upon receipt of the data, the cultivation assisting device 10 applies the cultivation assistance model to derive the nanobubble water use condition that allows the outcome designated by the one grower U to have the most favorable content (for instance, that maximizes the yield). The nanobubble water use condition derived at this time corresponds to the kind of the crop plant A cultivated by the one grower U and a cultivation condition adopted in the cultivation.

Subsequently, the cultivation assisting device 10 converts the derived nanobubble water use condition and the content of the cultivation outcome that is expected to be obtained when that use condition is adopted into data, and outputs the data to the one grower U. By decompressing the data output from the cultivation assisting device 10 in the communication terminal 50, the one grower U can check the nanobubble water use condition derived by the cultivation assisting device 10 along with the content of the cultivation outcome expected to be obtained under that condition.

Further, in the embodiment, the cultivation assisting device 10 can predict a content of a cultivation outcome in the case where the one grower U continues cultivation while maintaining a cultivation implementation condition used in the middle of the cultivation without any modification, by use of the cultivation assistance model. Further, when the predicted content does not satisfy a standard having been set in advance (for instance, when a predicted content of the cultivation outcome designated by the one grower U is not favorable), the cultivation assisting device 10 performs a warning operation through the communication terminal 50 of the one grower U to inform that. This can urge the one grower U to review the cultivation implementation condition and the like.

The warning operation is an operation to display a warning screen in the communication terminal 50, generate an alarm sound or vibration in the communication terminal 50, or cause a light-emitting lamp mounted in the communication terminal 50 to emit light.

<<Configuration of Cultivation Assisting Device>>

Next, the configuration of the cultivation assisting device 10 is described.

The cultivation assisting device 10 is constituted of a server computer as described above. The number of server computers constituting the cultivation assisting device 10 may be one or plural. A server computer constituting the cultivation assisting device 10 has hardware configuration similar to a typical server computer and includes a central processing unit (CPU), a memory, a storage such as a hard disc drive, a communications interface, input devices such as a mouse and a keyboard, and output devices such as a display and a printer. A server computer constituting the cultivation assisting device 10 stores a computer program used to exercise the functions of the cultivation assisting device 10.

In the embodiment, a server computer constituting the cultivation assisting device 10 is a so-called augmented intelligence (AI) and constitutes a "cognitive computing system" that understands and learns a natural language and assists human decision-making; a typical example thereof is an Internet of Things (IoT) platform based on Watson (trademark) of IBM.

The cultivation assisting device 10 communicates with the communication terminal 50 of each grower U via a network. The communication terminal 50 has an application program installed therein that allows the use of the cultivation assistance service, and when the application program is activated, a predetermined graphical user interface (GUI) appears on the terminal display. The intention of the grower U is input through the GUT, and the input data is sent to the cultivation assisting device 10 from the communication terminal 50. The cultivation assisting device 10 can also acquire cultivation information of each grower U through communication with the relevant. communication terminal 50.

The cultivation assisting device 10 can acquire cultivation information from other devices than the communication terminal 50, such as a sensor and a camera disposed in the cultivation site (e.g., in an agricultural field or a greenhouse) by the grower U, a data communication device built in the nanobubble water generating apparatus 100 used by the grower U, a server computer managed by a government office such as a meteorological agency to provide data, a web server managed by a provider of web contents that the grower U uses.

The cultivation assisting device 10 has a database 11 of already acquired cultivation information for each grower (see FIG. 2). While in the embodiment, the database 11 is stored in the storage built in the cultivation assisting device 10, the invention is not limited thereto, and the database 11 may be stored in an external storage provided to the cultivation assisting device 10 or a database server connected to the cultivation assisting device 10 via a network.

Figure 3:
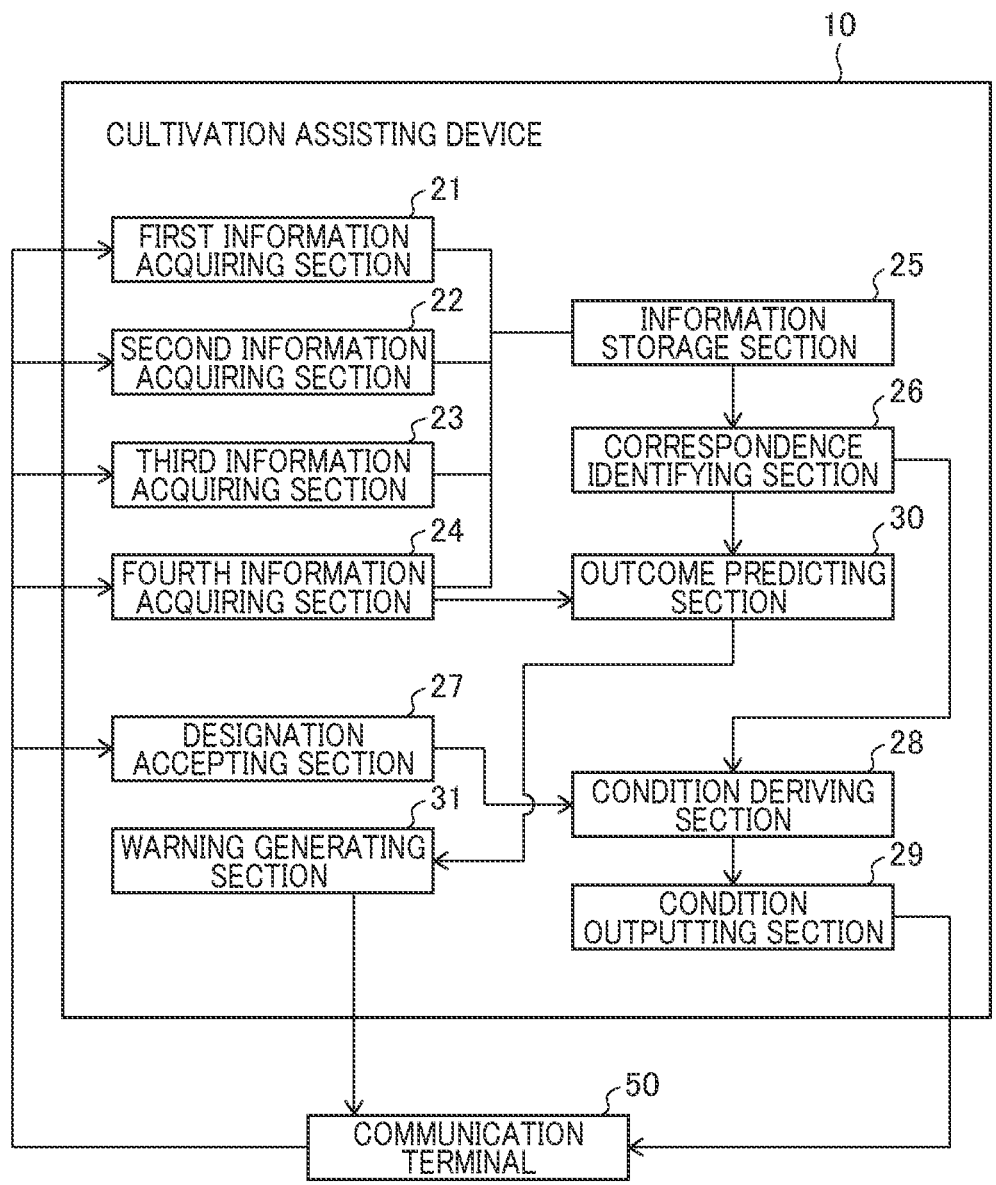
FIG. 3 is a view showing the configuration of a cultivation assisting device from the functional aspect.

The configuration of the cultivation assisting device 10 is again described from the functional aspect. As shown in FIG. 3, the cultivation assisting device 10 includes a first information acquiring section 21, a second information acquiring section 22, a third information acquiring section 23, a fourth information acquiring section 24, an information storage section 25, a correspondence identifying section 26, a designation accepting section. 27, a condition deriving section 28, a condition outputting section 29, an outcome predicting section 30 and a warning generating section 31. These functional sections are realized by cooperation of the foregoing hardware equipment of the server computer constituting the cultivation assisting device 10 and software (computer program) stored in the server computer.

FIG. 3 is a view showing the configuration of the cultivation assisting device 10 from the functional aspect.

The first information acquiring section 21 acquires, of the cultivation information, the first information related to the nanobubble water use conditions for each grower, and in the case where the grower U cultivates plural kinds of crop plants, acquires the first information for each kind. In the embodiment, at least one of information (A1) representing a condition set by the grower U for use of nanobubble water, information (A2) representing a feature value of nanobubble water (specifically, the particle size, the number and the zeta potential of bubbles, and the like) measured with a measurement device and the like during use of nanobubble water, and information (A3) representing an operation management value registered in the nanobubble water generating apparatus 100, is acquired as the first information.

The information (A1) is information on, for example, the time to use nanobubble water and the amount and the frequency of use of nanobubble water. The information (A1) can be acquired in the following manner: Information obtained in a hearing with the grower U or by other means is entered through an input device of the cultivation assisting device 10, or information entered by the grower U through the communication terminal 50 is converted into data and sent to the cultivation assisting device 10. Alternatively, language information obtained by applying a known speech recognition technique to sounds generated when the grower U talks about the nanobubble water use condition may be converted into data and acquired as text data. Still alternatively, the grower U's writing about the nanobubble water use condition that has written on a predetermine web site (e.g., a posting site such as a social networking service (SNS)) may be extracted from the web site and converted into data, thus acquiring the information (A1).

The information (A2) is information on, for example, the number, the particle size and the zeta potential of bubbles contained in nanobubble water. The information (A2) can be acquired in the following manner: Information on a measurement result is entered into the communication terminal 50 by the grower U, converted into data and sent to the cultivation assisting device 10, or a measurement result is directly sent from a measurement device having a communication function to the cultivation assisting device 10. For a device measuring the particle size (modal particle size) and the number of bubbles contained in nanobubble water, a known measurement device, e.g., a nanoparticle analysis system of NanoSight series (manufactured by NanoSight Ltd.) is usable. For a device measuring the zeta potential of bubbles, a known measurement device, e.g., ZetaView (MicrotracBEL Corp.) is usable.

The information (A3) is information on, for example, conditions for operation of the nanobubble water generating apparatus 100. The information (A3) can be acquired in the following manner: Data representing an operation management value is sent from a communication device built in the nanobubble water generating apparatus 100 to the cultivation assisting device 10, or information representing the operation management value is obtained by making inquiry to the manufacturer of the apparatus.

The information (A1) to (A3) may comprise not only information representing conditions under which a good outcome was obtained but also information on conditions under which cultivation was failed.

The second information acquiring section 22 acquires, of the cultivation information, the second information related to a cultivation outcome for each grower, and in the case where the grower U cultivates plural kinds of crop plants, acquires the second information for each kind. The second information is supplied from a grower after cultivation is finished (specifically, after products are harvested). In the embodiment, at least one of information (B1) representing a feature value of a crop plant measured with a sensor at the cultivation site of the crop plant, information (B2) representing a feature value of a taken part measured with respect to the taken part taken from the crop plant, language information (B3) representing a content of a cultivation outcome expressed by the grower U, and crop plant image information (B4) is acquired as the second information.

The information (B1) represents a measurement result obtained by automatically measuring a feature value (specifically, the color, the size, the number and the like) of a crop plant with a sensor when the cultivation is finished. The information (B1) can be acquired in the following manner: When a sensor itself has a communication function, a measurement result is sent from the sensor to the cultivation assisting device 10, or information on a measurement result is entered into the communication terminal 50 by the grower U, converted into data and sent to the cultivation assisting device 10.

The information (B2) represents a measurement result obtained by taking a part of a crop plant as the taken part when the cultivation is finished and then manually measuring a feature value (specifically, the sugar content, the moisture content, the degree of occurrence of damage caused by diseases or pests, and the like) of the taken part. The information (B2) can be acquired in the following manner: Information on a measurement result is entered into the communication terminal 50 by the grower U, converted into data and sent to the cultivation assisting device 10, or a measurement result is directly sent from a measurement device having a communication function to the cultivation assisting device 10.

The language information (B3) is information representing the grower U's impression and the like about a cultivation outcome. The language information (B3) may be acquired in the following manner: language information obtained by applying a known speech recognition technique to sounds of speech of the grower U is converted into data and acquired as text data. Alternatively, the grower U may enter text into the communication terminal 50, which text is then converted into data and sent to the cultivation assisting device 10, thus acquiring the language information (B3). Still alternative methods may be adopted, as follows: Each grower U is requested to write the grower's impression on a cultivation outcome as a report, and the contents of the report are entered through an input device of the cultivation assisting device 10, or the report is read with a scanner or the like and converted to text data by means of, for instance, the optical character recognition (OCR) technique. Still alternatively, the grower U's writing about a cultivation outcome that has written on a predetermine web site (e.g., a posting site such as SNS) may be extracted from the web site and converted into data, thus acquiring the language information (B3). The language information (B3) may comprise not only positive information related to a good outcome (i.e., a success example) but also negative information related to an outcome obtained when the cultivation was failed (i.e., a failure example).

The image information (B4) is an image of a harvested product or a portion other than a harvested product in a crop plant, or in the case where a crop plant has damage caused by diseases or pests or physiological disorder, an image showing the degree of the damage. The image information (B4) can be acquired by sending data of an image taken with a camera to the cultivation assisting device 10.

While in the embodiment, the second information is information on a cultivation outcome at the time when the cultivation is finished or at the time of harvesting, the invention is not limited thereto, and the second information may be information on an outcome during cultivation, for example, may include information on the state of growth of a crop plant immediately before harvesting (specifically, information equivalent to the fourth information to be described later).

The third information acquiring section 23 acquires, of the cultivation information, the third information related to a cultivation condition for each grower, and in the case where the grower U cultivates plural kinds of crop plants, acquires the third information for each kind. In the embodiment, at least one of information (C1) used to identify the cultivation environment, information (C2) representing a condition value measured with a sensor at a cultivation site of a crop plant, and information (C3) representing a cultivation condition set by the grower U is acquired as the third information.

The information (C1) is information on, for example, the location, the climate, the weather, the amount of precipitation and the amount of insolation of a cultivation site. The information (C1) can be acquired by receiving information (e.g., location information or time information) sent from the communication terminal 50 of the grower U or making access to a server computer or a public database used for a data providing purpose and managed by a government office.

The information (C2) represents a measurement result obtained when a sensor automatically measures a measurement subject (specifically, the temperature, the humidity, the concentration of carbon dioxide, pH, the electrical conductivity, the amount of dissolved oxygen, or the like) at a cultivation site during a cultivation period. The information (C2) can be acquired in the following manner: When a sensor itself has a communication function, a measurement result is sent from the sensor to the cultivation assisting device 10, or information on a measurement result is entered into the communication terminal 50 by the grower U, converted into data and sent to the cultivation assisting device 10.

The information (C3) is information on, for example, a cultivation season, a cultivation method, the types of a fertilizer and an agrochemical used during cultivation as well as the frequency of use thereof, the cultivation area, and the like. The information (C3) can be acquired in the following manner: Information obtained in a hearing with the grower U or by other means is entered through an input device of the cultivation assisting device 10, or information entered by the grower U through the communication terminal 50 is converted into data and sent to the cultivation assisting device 10. Alternatively, the language information obtained by applying a known speech recognition technique to sounds generated when the grower U talks about a cultivation condition may be converted into data and acquired as text data.

The information (C1) to (C3) may comprise not only information representing a condition under which a good outcome was obtained but also information on a condition under which the cultivation was failed.

The fourth information acquiring section 24 acquires, of the cultivation information, the fourth information related to the state of growth of a crop plant during a cultivation period for each grower, and in the case where the grower U cultivates plural kinds of crop plants, acquires the fourth information for each kind in the embodiment, the fourth information includes at least one of information (D1) representing a feature value of a crop plant measured with a sensor at a cultivation site of the crop plant, information (D2) representing a feature value of a taken part measured with respect to the taken part taken from a crop plant, language information (D3) representing the state of growth of a crop plant expressed by the grower, and crop plant image information (D4).

The contents of the information (D1) to (D4) and the method for acquiring the information are the same as those for the information (B1) to (B4) corresponding to the second information described above except that the information is acquired in the middle of the cultivation period, and therefore the description is omitted.

In the embodiment, the fourth information acquiring section 24 acquires the fourth information plural times at different acquisition times during the cultivation period during which the same grower U cultivates the same kind of a crop plant. In other words, the fourth information representing the state of growth of a crop plant in the middle of cultivation is acquired plural times as time-series information in one cultivation process of a crop plant conducted by each grower U. Temporal change of the state of growth of a target crop plant can be identified from plural pieces of the fourth information acquired during the same cultivation period. The frequency (cycle) of acquisition of the fourth information is not particularly limited and may be set as desired.

The information storage section 25 stores various information (cultivation information) acquired by the first information acquiring section 21, the second information acquiring section 22, the third information acquiring section 23 and the fourth information acquiring section 24 for each grower in association with identification information of the grower U and identification information of the kind of a crop plant, and constructs a database 11.

The correspondence identifying section 26 identifies a correspondence between a cultivation implementation condition and a cultivation outcome by use of the cultivation information (i.e., the first to fourth information) for each grower stored in the information storage section 25, more specifically, constructs a cultivation assistance model representing the correspondence. The method of identifying a correspondence (in other words, the procedures for constructing a cultivation assistance model) is described in a later part.

While in the embodiment, a correspondence between a cultivation implementation condition and a cultivation outcome is identified using the first to fourth information, a correspondence may be identified using at least the first information and the second information. For instance, only the first information and the second information for each grower may be used; in this case, the correspondence identifying section 26 identifies a correspondence between a nanobubble water use condition and a cultivation outcome.

The designation accepting section 27 accepts the designation of a cultivation outcome made by the grower U. The designation of a cultivation outcome is an action of the grower U to determine on which outcome the grower places importance in cultivation of a crop plant and designate the outcome, and this action is required for use of the cultivation assistance service. In the embodiment, plural outcomes determined from different points of view (e.g., the sugar content and the yield of a harvested product) can be designated; in this case, the designation accepting section 27 accepts the designation of each of the plural outcomes along with the weight set for each of the plural outcomes. The weight herein is a numeral value representing how much importance the grower U places on an outcome corresponding to the weight (i.e., the priority), and in the embodiment, setting is made such that the sum of weights of the outcomes is 100.

The condition deriving section 28 derives a nanobubble water use condition optimized based on the designation of an outcome accepted at the designation accepting section 27 and the correspondence identified by the correspondence identifying section 26 (in other words, the cultivation assistance model). The expression "nanobubble water use condition optimized" herein refers to a use condition corresponding to a cultivation condition adopted by the grower U that performed the designation. of an outcome and also corresponding to the designated outcome. More specifically, the condition deriving section 28 derives a nanobubble water use condition that allows the designated outcome to have the most favorable content or a nanobubble water use condition that allows a content of the designated outcome to satisfy a standard (e.g., a standard set in terms of the quality) under a cultivation condition adopted by the grower U that performed the designation of the outcome.

When the designation accepting section 27 accepts the designation of plural outcomes, the condition deriving section 29 derives a nanobubble water use condition corresponding to the designated plural outcomes in such a manner that an outcome set with a larger weight is prioritized. The expression "an outcome set with a larger weight is prioritized" herein refers to, for instance, placing importance on a content of an outcome set with a larger weight such that this outcome can have a favorable content compared to an outcome set with a smaller weight.

The condition outputting section 29 outputs the nanobubble water use condition derived by the condition deriving section 28 to the communication terminal 50 of the grower U that designated an outcome. In the embodiment, the condition outputting section 29 generates data used to present, to the grower U, the nanobubble water use condition derived by the condition deriving section 28 and the content of the outcome to be obtained (more precisely, expected to be obtained) under that use condition, and sends the data to the communication terminal 50.

The outcome predicting section 30 predicts an outcome of cultivation of a crop plant cultivated by one grower U (hereinafter called "subject grower") based on the current state of growth of the crop plant. For the prediction of a cultivation outcome, use is made of information representing the state of growth of a crop plant after the subject grower started the cultivation (i.e., the fourth information) and the foregoing cultivation assistance model (more precisely, a secondary model to be described later).

The warning generating section 31 issues a warning to the subject grower, specifically, generates data (hereinafter called "warning generation data") used to cause the communication terminal 50 of the subject grower to generate an alarm sound, generate vibration, emit light from a light-emitting lamp, display a warning screen, or the like, and sends the data to the communication terminal 50 of the subject grower when the content of the cultivation outcome predicted by the outcome predicting section 30 does not satisfy the standard having been set in advance.

The expression "standard having been set in advance" refers to details set as the standard that should be satisfied by cultivation outcome, and examples thereof include the upper and lower limit values of the sugar content, the acidity or the like of a harvested product, the lower limit value of the yield, a standard shape and size of a harvested product that is shippable as a commercial product. Besides, applicability conditions of grades set for fruits may be adopted as the standard.

<<Operation Example of Cultivation Assisting Device>>

Next, as an operation example of the cultivation assisting device 10, a flow of the processing performed by a server computer constituting the cultivation assisting device 10 (hereinafter called "cultivation assistance flow") is described. The cultivation assisting method of the invention is adopted in the cultivation assistance flow, and the respective steps (S001 to S005, S011 to S014) described below correspond to constituent elements of the cultivation assisting method of the invention.

Figure 4:
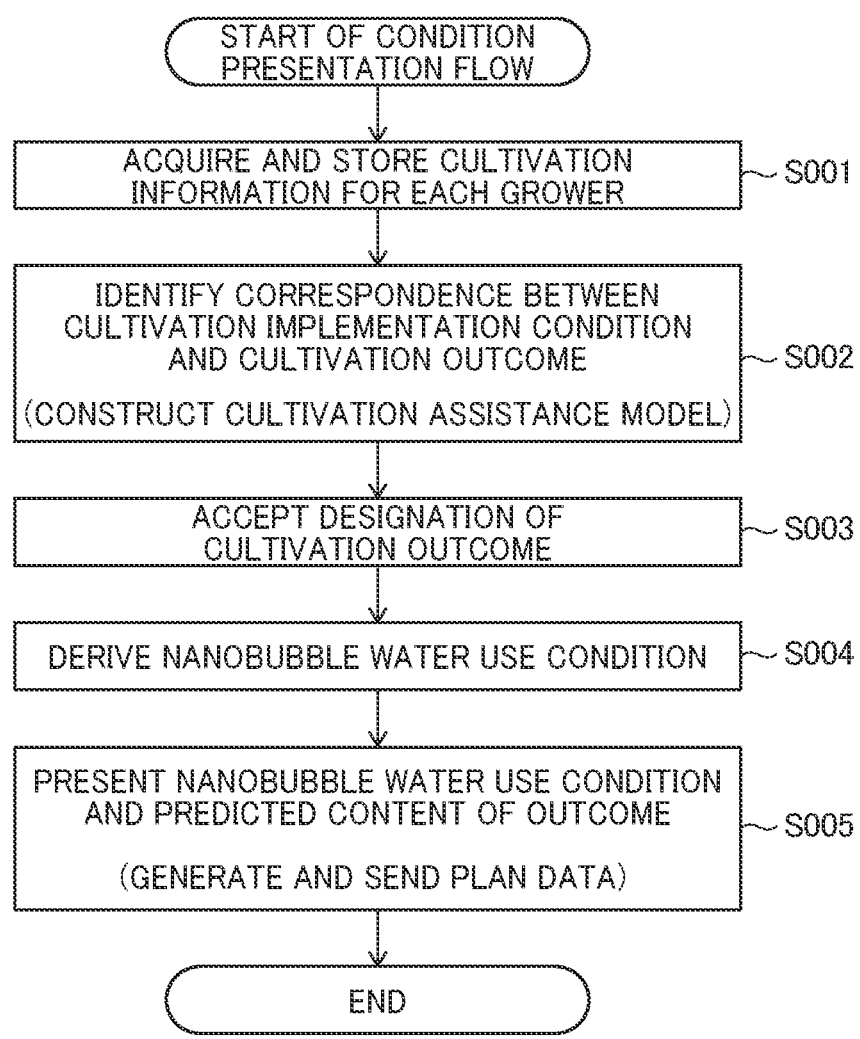
FIG. 4 is a view showing a cultivation assistance flow (part 1).
Figure 5:
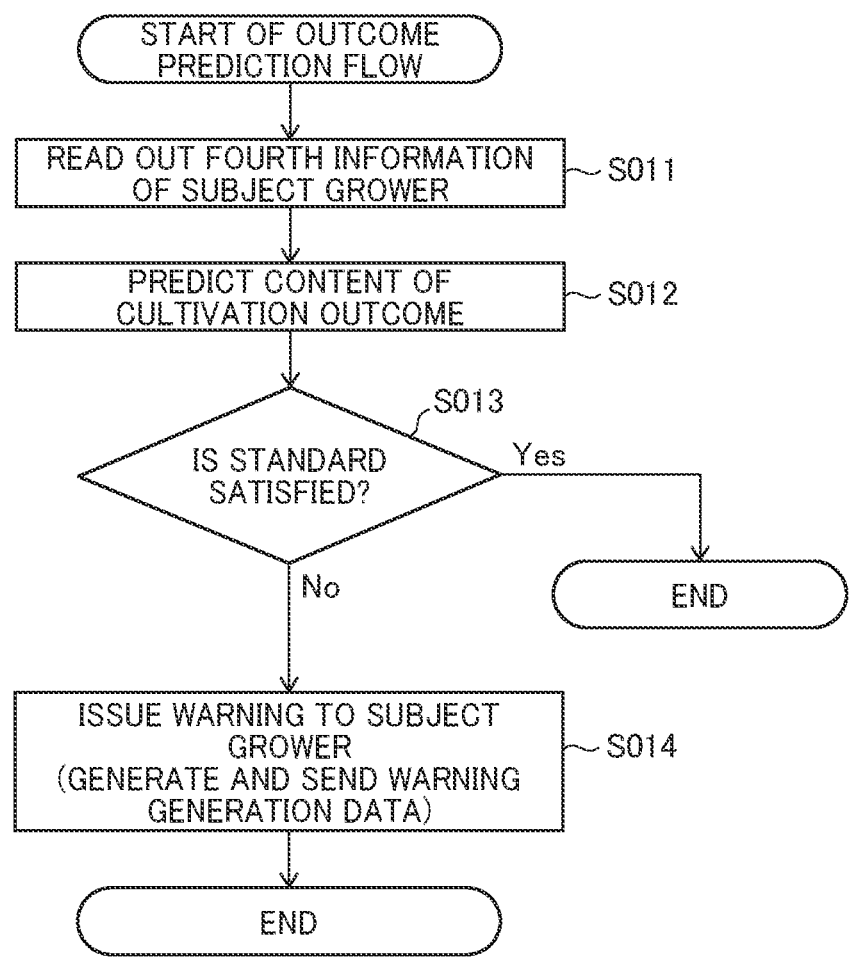
FIG. 5 is a view showing a cultivation assistance flow (part 2).

The cultivation assistance flow is constituted of a condition presentation flow shown in FIG. 4 and an outcome prediction flow shown in FIG. 5. The condition presentation flow is usually performed in a previous stage before the subject grower starts cultivation of a crop plant, while the outcome prediction flow is usually performed during a period of time during which the subject grower is performing the cultivation of the crop plant (i.e., during the cultivation period).

The condition presentation flow is described. First, the server computer (hereinafter simply called "computer") constituting the cultivation assisting device 10 acquires and stores cultivation information for each grower and constructs a database of the cultivation information (S001). That is, in Step S001, the computer acquires the first to fourth information for each grower in the manner described above and stores the information in association with identification information of the relevant grower and identification information of the relevant kind of a crop plant. For the fourth information, information is acquired plural times at different acquisition times during the cultivation period during which the same grower cultivates the same kind of a crop plant.

In acquisition of the cultivation information (particularly information provided by the grower U) in Step S001, the grower U that is the source of information is not particularly limited, and examples thereof may include a beginner of cultivation of a crop plant, not to mention an experienced grower and a skilled grower in cultivation of a crop plant. By offering a reward to the grower U providing the cultivation information as an initiative to provision of information, it is possible to obtain more advantageous and more credible cultivation information.

The number of the growers U that provide the cultivation information, i.e., the number N of samples is not particularly limited; it suffices if the number N is one or more but of course the more the number N, the better.

In order to ensure the amount of accumulated cultivation information, for instance, Step S001 may be performed over several months or several years, whereafter the subsequent steps are performed.

Next, the computer identifies a correspondence between a cultivation implementation condition and a cultivation outcome by use of the accumulated cultivation information for each grower (S002). In Step S002, in order to identify the correspondence, the computer performs machine learning using the cultivation information for each grower and constructs the cultivation assistance model that is a mathematical model representing the correspondence.

The machine learning above is described in detail. The computer performs the machine learning in two stages. In the early half of the machine learning (hereinafter called "primary learning"), the computer identifies a primary correspondence between a cultivation implementation condition (i.e., a nanobubble water use condition and a cultivation condition) and the state of growth of a crop plant during the cultivation period based on the first information, the third information and the fourth information for each grower. More specifically, in the embodiment, the primary learning is performed using the fourth information having been acquired plural times during the cultivation period for one grower U (hereinafter called "a group of pieces of fourth information"). Thus, a mathematical model (hereinafter called "primary model") representing the primary correspondence between temporal change of the state of growth of the crop plant identified based on the group of pieces of fourth information and the cultivation implementation condition is constructed.

In the primary learning, the first information, the third information and the fourth information are preferably converted into a vector/tensor form in advance by a known method, specifically, one-hot representation, word2vec, latent dirichlet allocation (LDA) or the like.

In the latter half of the machine learning (hereinafter called "secondary learning"), the computer identifies a secondary correspondence between the state of growth of the crop plant during the cultivation period and a cultivation outcome based on the second information and the fourth information for each grower. More specifically, in the embodiment, the secondary learning is performed using the group of pieces of fourth information. Thus, a mathematical model (hereinafter called "secondary model") representing the secondary correspondence between temporal change of the state of growth of the crop plant identified based on the group of pieces of fourth information and the cultivation outcome is constructed.

For the secondary learning, the second information is also preferably converted into a vector/tensor form in advance by any of the methods listed above as examples.

After the two stages of the machine learning above are performed, the primary model and the secondary model constructed through the learnings are integrated to construct the cultivation assistance model. In other words, the correspondence between the cultivation implementation condition and the cultivation outcome is identified in such a way as to include the primary correspondence and the secondary correspondence.

When cultivation information is newly acquired and this results in an increase in the amount of accumulated cultivation information, it is preferable to again perform the machine learning to reconstruct the primary model and the secondary model, thereby updating the cultivation assistance model.

The method of the machine learning is not limited, and there may be adopted for instance neural network, more precisely deep learning, as well as random forest, support vector machine, bagging, boosting and the like. The method for identifying a correspondence is not limited to the machine learning, and general linear regression analysis or data mining may be used.

Next, the computer accepts the designation of a cultivation outcome made by the subject grower (S003). Specifically, the subject grower designates a cultivation outcome on which the grower places importance in the cultivation of a crop plant through GUI (specifically, an outcome designation screen shown in FIG. 7) that appears on the terminal display of the grower's communication terminal 50 upon activation of an application program of the cultivation assistance service. At this time, the subject grower enters text representing a cultivation outcome on which the grower places importance through a touch panel or enters a word representing a cultivation outcome on which the grower places importance by speech input.

The grower U may enter a cultivation outcome by freely entering text or selecting one from options set in advance in terms of, for example, the yield, the amount of shipment, the quality of harvested products, the harvesting time, the amount of use of an agrochemical or the like, the degree of damage caused by diseases or pests, the stability of harvesting, the freshness preservability after harvesting, the profitability (specifically, the value-adding properties and the commercial value), and other factors. In the case where text is entered in terms of the above-listed items as a cultivation outcome, examples of the text include the following.

[Yield] A larger quantity (number of products) is desired; a larger weight is desired.

[Amount of shipment] It is desired to simply increase the yield; it is desired to decrease waste products with poor quality.

[Quality] A higher sugar content is desired; it is desired to produce products with good color and shape; it is desired to produce products with good preservability.

[Harvesting time] It is desired to prolong the harvesting time; a higher yield at an earlier stage; adjustment of a harvest cycle; more efficient work.

[Amount of use of agrochemical etc.] Cost reduction; publicizing safety and security; achieving labor saving and lighter work.

[Degree of damage caused by diseases or pests] Reducing waste products; achieving labor saving and lighter work.

[Stability of harvesting] Increasing client satisfaction and reliability; branding of a production region; increasing productivity.

[Freshness preservability] A longer storage life is desired after harvesting.

[Value-adding properties/commercial value] Differentiation is desired; it is desired to sell products with higher prices.

The communication terminal 50 of the subject grower generates data representing the entered cultivation outcome and sends the data to the computer, and the computer receives the data from the communication terminal 50. Since the data that the computer receives from the communication terminal 50 represents language information representing the cultivation outcome designated by the grower U (i.e., the subject grower) that uses the communication terminal 50, the computer receives the data (in other words, acquires the language information) to thereby accept the designation of the cultivation outcome.

Figures 6, 7:
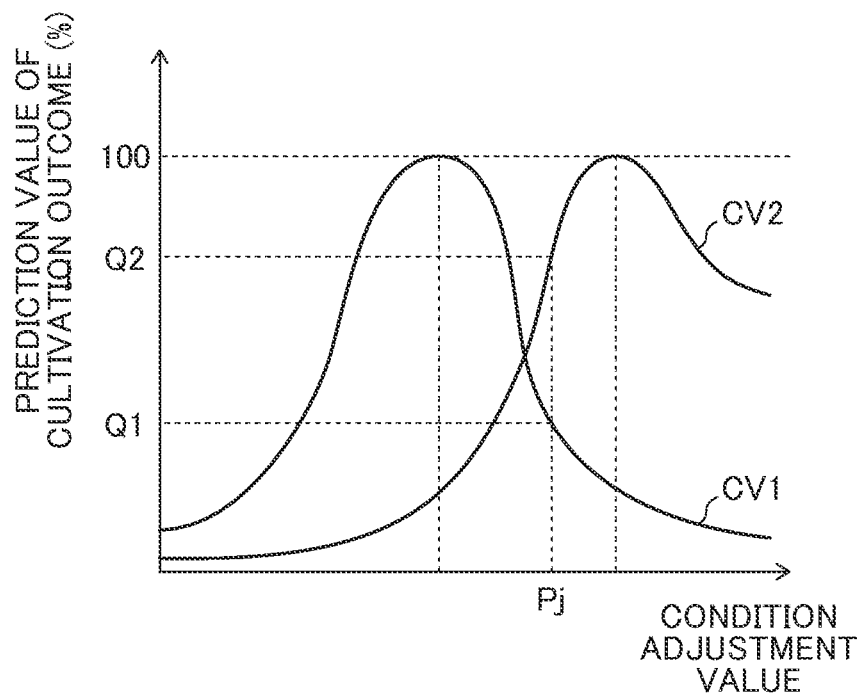
FIG. 6 is a view showing a graph that is referred in order to describe the procedure for deriving an optimal condition adjustment value taking the weight of each of plural cultivation outcomes designated into consideration.
FIG. 7 is a view showing an example of an outcome designation screen.

In the embodiment, the subject grower can designate plural cultivation outcomes from different points of view as shown in FIG. 7, and in this case, sets the weight for each outcome as shown in the figure. The communication terminal 50 generates data representing the plural outcomes designated and the weights separately set for the respective outcomes and sends the data to the computer. The computer receives the data from the communication terminal 50 to thereby accept the designation of each of the plural outcomes along with the weight set for each outcome.

While the number of cultivation outcomes that can be designated may be determined to a given number that is one or more, the description is made below taking as an example the case where two cultivation outcomes are designated as in the case of FIG. 7 for easier understanding.

After accepting the designation of the cultivation outcome, the computer derives a nanobubble water use condition optimized for the designated outcome (S004). In Step S004, the computer reads out, from the database, the third information associated with the identification information of the grower (i.e., the subject grower) that performed the designation of the cultivation outcome, and inputs a cultivation condition represented by the read-out third information and the designated cultivation outcome to the cultivation assistance model as parameters. Consequently, a use condition corresponding to the cultivation condition adopted by the subject grower and also to the cultivation outcome designated by the subject grower is derived as a nanobubble water use condition.

When the plural cultivation outcomes are designated, the computer derives a use condition corresponding to the designated plural outcomes in such a manner that an outcome set with a larger weight is prioritized. For instance, when "sugar content of harvested product" and "yield" are designated as the plural cultivation outcomes and the weight of "sugar content of harvested product" is set higher than that of "yield," a use condition that allows the yield and the sugar content according to their weights to be obtained is derived while more importance is placed on "sugar content of harvested product" than on "yield".

The method of deriving a use condition when the weight is set to each of plural cultivation outcomes is not particularly limited, and one example thereof is briefly described below.

For example, it is assumed that "sugar content" and "yield" are designated as the plural cultivation outcomes and their weights wa and wb are set. A value of a nanobubble water use condition (e.g., the amount of use of nanobubble water, the use period, the number of bubbles in nanobubble water, or the like) that affects both "sugar content" and "yield" is hereinafter called "condition adjustment value" for convenience.

When an optimal condition adjustment value is derived taking the weights of the designated cultivation outcomes into consideration, a correspondence between the condition adjustment value and each of the plural cultivation outcomes (namely, "sugar content" and "yield") is referred.

While a correspondence between a condition adjustment value and a cultivation outcome is originally expressed by the cultivation assistance model, the description is made below based on the premise that the correspondences above are approximated by the prediction curves CV1 and CV2 shown in FIG. 6 for easier understanding.

Note that since the range that a value indicative of a cultivation outcome can take may vary depending on the content of the cultivation outcome, the prediction values of the cultivation outcomes in the prediction curves CV1 and CV2 are assumed to have been normalized and for instance, are expressed as the percentage with the maximum value being 100.

While the prediction curves CV1 and CV2 have bell-shaped curves in FIG. 6, the shape thereof is not particularly limited, and the curves may have a different shape such as a parabolic shape, an exponential shape, an S-shaped curve as exemplified by a logistic curve and a Gomperz curve, or other shapes.

A score X for the cultivation outcomes is calculated by referring to the prediction curves CV1 and CV2 and using the condition adjustment value as a parameter. When the prediction values of the cultivation outcomes in the prediction curves CV1 and CV2 with the condition adjustment value being Pj are defined as Q1 and Q2, the score X is calculated by the following formula.

$$\text{Score } X = Q1 \times wa + Q2 \times wb$$

The score X is calculated with the condition adjustment value Pj being varied, thereby identifying the condition adjustment value Pj with which the score X is the maximum value. The condition adjustment value Pj thus identified is the optimum solution of the condition adjustment value derived taking the weights of the respective cultivation outcomes designated into consideration.

Returning to the description on the condition presentation flow, after Step S004, the computer generates data (hereinafter called "plan data") used to present, to the subject grower, the derived nanobubble water use condition and a content of the cultivation outcome expected to be obtained under that use condition, and sends the plan data to the communication terminal 50 of the subject grower (S005). When the communication terminal 50 receives and decompresses the plan data, the nanobubble water use condition derived by the computer is displayed along with the predicted content of the cultivation outcome under that use condition in GUI (specifically, the plan presentation screen shown in FIG. 8) on the terminal display. The subject grower checks the nanobubble water use condition and the cultivation outcome displayed on the terminal display and considers whether to adopt the use condition in cultivation of a crop plant.

The computer may derive plural candidate conditions as the nanobubble water use condition in Step S004. The plural candidate conditions are a plurality of solutions derived by the computer as optimized nanobubble water use conditions, while contents of a cultivation outcome to be obtained under the respective conditions vary. When plural candidate conditions are derived, the computer generates the plan data for each candidate condition and sends the data to the communication terminal 50 of the subject grower in Step S005. In this case, the subject grower can check each of the plural candidate conditions along with a predicted content of a cultivation outcome under the relevant condition. This provides the subject grower with a wider range of choices of nanobubble water use conditions to be adopted in cultivation.

Once the series of steps above finishes, the condition presentation flow of the cultivation assistance flow finishes. Afterward, the subject grower starts cultivation of a crop plant, and during the cultivation, the outcome prediction flow is performed at the appropriate time to perform the flow.

In the outcome prediction flow, first, the computer reads out a group of pieces of fourth information representing temporal change of the state of growth of the crop plant cultivated by the subject grower over a period of time from the start of cultivation until the present time, from a database (S011). Next, the computer predicts a content of a cultivation outcome for the crop plant cultivated by the subject grower based on the read-out group of pieces of fourth information and the secondary model (that is, the secondary correspondence between the temporal change of the state of growth of the crop plant and the cultivation outcome as identified in. Step S002) constructed in the condition presentation flow (S012). Then, the computer determines whether the predicted content of the cultivation outcome satisfies the standard (S013). Once the computer determines that the predicted content of the cultivation outcome satisfies the standard, the outcome prediction flow finishes at that time.

In contrast, when the computer determines that the predicted content of the cultivation outcome does not satisfy the standard, the computer issues a warning to the subject grower, specifically, generates warning generation data and sends the data to the communication terminal 50 of the subject grower (S014). Upon receipt of the warning generation data, the communication terminal 50 of the subject grower generates an alarm sound, generates vibration, emits light from a light-emitting lamp, displays a warning screen, or the like. This can attract the subject grower's attention and urge the subject grower to reconsider the nanobubble water use condition. It is further desirable to, together with issuance of the warning, display a nanobubble water use condition that makes the content of the cultivation outcome better than the predicted content of the cultivation outcome as a recommended condition on the communication terminal 50 of the subject grower.

Once the warning is issued, the outcome prediction flow finishes at that time. Thereafter, the outcome prediction flow is repeated at substantially regular time intervals during a period of time during which the subject grower cultivates the crop plant.

<<Effectiveness of the Embodiment>>

In the embodiment, as described above, cultivation information (i.e., information on a cultivation implementation condition and a cultivation outcome) is acquired for each grower, stored and accumulated as a database. The accumulated cultivation information is utilized as big data. Specifically, a correspondence between a cultivation implementation condition and a cultivation outcome can be identified through machine learning using the accumulated cultivation information. This makes it possible to obtain a nanobubble water use condition that allows a content of a cultivation outcome on which a grower places importance to be a favorable one in cultivation of a crop plant using nanobubble water.

That is, according to the embodiment, intuition and feeling of a grower, which are usually regarded as tacit knowledge (know-how), can be transformed into information (i.e., visualized) and shared among growers in cultivation of a crop plant (agriculture) using nanobubble water. Further, it is possible to determine an algorithm for a decision-making process of a grower in use of nanobubble water by analyzing information through machine learning or other methods, and this makes it possible to adequately present a condition that allows effective use of nanobubble water to a grower (particularly a grower with little experience).

Cultivation information acquired from growers, that is, big data includes language information (specifically, sounds of speech, text of a report, posting on a web site, and the like) representing each grower's impression on a cultivation outcome or the state of cultivation of a crop plant. Such language information is beneficial and important to identify a correspondence between a cultivation implementation condition and a cultivation outcome. Accordingly, it is possible to present a more adequate nanobubble water use condition to a grower.

<<Other Embodiments>>

One specific embodiment of the cultivation assisting device and the cultivation assisting method according to the invention has been described above; however, the foregoing embodiment is merely an example, and other embodiments are also applicable.

Figure 9:
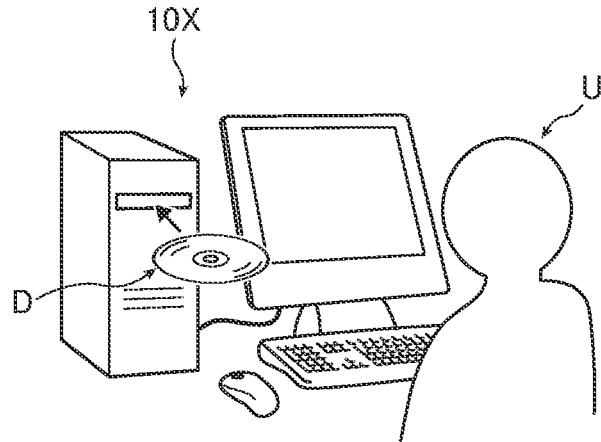
FIG. 9 is a view showing a cultivation assisting device according to a modification.

While in the foregoing embodiment, the cultivation assisting device 10 is constituted of a server computer, the invention is not limited thereto, and for instance, a personal computer possessed by the grower U may constitute a cultivation assisting device 10X as shown in FIG. 9. That is, a CPU of the personal computer possessed by the grower U may execute a computer program stored in a storage medium D to thereby exert the function as the cultivation assisting device 10X. In this case, cultivation information for each grower may be accumulated in the storage medium D or a database server on a network to allow the computer of the grower U to read out the information therefrom and use the information in machine learning.

FIG. 9 is a view showing the cultivation assisting device 10X according to the modification.

Besides, in the foregoing embodiment, the cultivation assisting device 10 receives data representing the result of designation of a cultivation outcome made by the grower U sent from the communication terminal 50 of the grower U to accept the designation. Further, in the foregoing embodiment, in order to present a nanobubble water use condition derived by the cultivation assisting device 10 to the grower U, data (plan data) is sent to the communication terminal 50, and the nanobubble water use condition represented by the data is displayed on the terminal display. However, the invention is not limited thereto, and for example, a cultivation outcome designated by the grower U may be obtained, for instance, through conversation in an interview, by telephone or facsimile, or in writing such as a letter, and an operator of the cultivation assisting device 10 may enter the cultivation outcome through an input device, thus accepting the designation of the cultivation outcome. A nanobubble water use condition derived by the cultivation assisting device 10 may also be presented to the grower U through conversation in an interview, by telephone or facsimile, or in writing such as a letter.

REFERENCE SIGNS LIST 10, 10X cultivation assisting device
11 database
21 first information acquiring section
22 second information acquiring section
23 third information acquiring section
24 fourth information acquiring section
25 information storage section
26 correspondence identifying section
27 designation accepting section.
28 condition deriving section
29 condition outputting section
30 outcome predicting section
31 warning generating section
50 communication terminal 100 nanobubble water generating apparatus
110 liquid discharger
120 gas incorporating device
121 vessel
122 gas incorporating device body
130 ultrafine bubble generating apparatus
D storage medium
S cultivation assisting system
U grower

The invention claimed is:

1. A cultivation assisting device assisting in cultivation of a crop plant using nanobubble water, the cultivation assisting device comprising:
   a first information acquiring section configured to acquire first information related to a use condition of the nanobubble water for each grower of the crop plant;
   a second information acquiring section configured to acquire second information related to an outcome of the cultivation for the each grower;
   a third information acquiring section configured to acquire third information for the each grower, the third information being related to a cultivation condition for the crop plant other than the use condition;
   a fourth information acquiring section configured to acquire fourth information related to a state of growth of the crop plant during a cultivation period for the each grower;
   a correspondence identifying section configured to identify a correspondence between the use condition and the outcome based on the first information and the second information of the each grower;
   a designation accepting section configured to accept designation of the outcome;
   a condition deriving section configured to derive the use condition corresponding to the outcome designated, based on the correspondence; and
   a condition outputting section configured to output the use condition derived by the condition deriving section to a communication terminal operated by a grower,
   wherein the correspondence identifying section contracts a first mathematical model representing 1) a primary correspondence between i) a set of the use condition and the cultivation condition and ii) the state of growth of the crop plant during the cultivation period, based on the first information, the third information, and the fourth information of the each grower, and constructs a second mathematical model representing 2) a secondary correspondence between the state of growth of the crop plant during the cultivation period and the outcome based on the second information and the fourth information of the each grower, thereby constructing a cultivation assistance model representing the correspondence by integrating the first mathematical model representing the primary correspondence and the mathematical model representing the secondary correspondence, and
   wherein, when the designation accepting section accepts designation of the outcome, the condition deriving section derives the use condition corresponding to the cultivation condition represented by the third information of a grower that performed the designation of the outcome and also corresponding to the designated outcome by inputting the outcome designated and the cultivation condition represented by the third information of the grower that performed designation of the outcome to the cultivation assistance model.

2. The cultivation assisting device according to claim 1, wherein the correspondence identifying section identifies the correspondence by performing machine learning using the first information and the second information of the each grower.

3. The cultivation assisting device according to claim 2, wherein the designation accepting section accepts designation of each of a plurality of the outcomes set from different points of view, along with a weight set for each of the plurality of the outcomes, and
the condition deriving section derives the use condition corresponding to the plurality of the outcomes designated, in such a manner that an outcome set with a larger weight is prioritized.

4. The cultivation assisting device according to claim 1, wherein the designation accepting section accepts designation of each of a plurality of the outcomes set from different points of view, along with a weight set for each of the plurality of the outcomes, and
the condition deriving section derives the use condition corresponding to the plurality of the outcomes designated, in such a manner that an outcome set with a larger weight is prioritized.

5. The cultivation assisting device according to claim 1, wherein the first information is information representing at least one of following: time to use the nanobubble water; an amount of use of the nanobubble water per use; a frequency of use of the nanobubble water; the number of bubbles contained in the nanobubble water per unit volume; a particle size of the bubbles; a type of gas constituting the bubbles; a zeta potential of the bubbles; a condition for operation of an apparatus used to generate the nanobubble water; and
a state and a feature value of raw water of the nanobubble water.

6. The cultivation assisting device according to claim 1, wherein the second information is information representing at least one of following: a property of a harvested product of the crop plant; yield of the harvested product; harvesting time of the harvested product; and the state of a portion other than the harvested product in the crop plant.

7. The cultivation assisting device according to claim 1, wherein the second information includes at least one of information representing a feature value of the crop plant measured with a sensor at a cultivation site of the crop plant, information representing a feature value of a taken part measured with respect to the taken part taken from the crop plant, language information representing a content of the outcome expressed by a grower, and image information of the crop plant.

8. The cultivation assisting device according to claim 1, wherein the fourth information includes at least one of information representing a feature value of the crop plant measured with a sensor at a cultivation site of the crop plant, information representing a feature value of a taken part measured with respect to the taken part taken from the crop plant, language information representing the state of growth of the crop plant expressed by the grower, and image information of the crop plant.

9. The cultivation assisting device according to claim 8, wherein the fourth information acquiring section acquires the fourth information plural times at different acquisition times during the cultivation period during which a same grower cultivates a same kind of a crop plant, and
the correspondence identifying section identifies the primary correspondence between the set of the use condition and the cultivation condition, and temporal change of the state of growth of the crop plant identified based on the fourth information acquired plural times during the cultivation period, and the secondary correspondence between the temporal change and the outcome.

10. The cultivation assisting device according to claim 1, wherein the fourth information acquiring section acquires the fourth information plural times at different acquisition times during the cultivation period during which a same grower cultivates a same kind of a crop plant, and the correspondence identifying section identifies the primary correspondence between the set of the use condition and the cultivation condition, and temporal change of the state of growth of the crop plant identified based on the fourth information acquired plural times during the cultivation period, and the secondary correspondence between the temporal change and the outcome.

11. The cultivation assisting device according to claim 1, further comprising:

an outcome predicting section configured to predict a content of the outcome of the crop plant cultivated by a subject grower based on the fourth information related to the crop plant cultivated by the subject grower and the secondary correspondence; and a warning generating section configured to issue a warning to the subject grower when the content of the outcome predicted by the outcome predicting section does not satisfy a standard having been set in advance.

12. The cultivation assisting device according to claim 1, wherein the designation accepting section accepts the designation of the outcome by receiving data that represents the outcome designated by a grower by use of the communication terminal and that is sent from the communication terminal operated by the grower.

13. The cultivation assisting device according to claim 12, wherein the condition outputting section sends data used to present, to the grower, the use condition derived by the condition deriving section and a content of the outcome to be obtained under the use condition derived by the condition deriving section, to the communication terminal.

14. The cultivation assisting device according to claim 1, wherein the designation accepting section accepts the designation of the outcome by acquiring language information representing the outcome designated by a grower.

15. A cultivation assisting method assisting in cultivation of a crop plant using nanobubble water by use of a computer, the method comprising:

a step of, by a computer, acquiring first information related to a use condition of the nanobubble water for each grower of the crop plant;

a step of, by a computer, acquiring second information related to an outcome of the cultivation for the each grower;

a step of, by a computer, acquiring third information for the each grower, the third information being related to a cultivation condition for the crop plant other than the use condition;

a step of, by a computer, acquiring fourth information related to a state of growth of the crop plant during a cultivation period for the each grower;

a step of, by a computer, identifying a correspondence between the use condition and the outcome based on the first information and the second information of the each grower;

a step of, by a computer, accepting designation of the outcome;

a step of, by a computer, deriving the use condition corresponding to the outcome designated based on the correspondence; and a step of, by a computer, outputting the use condition derived in the step of deriving to a communication terminal operated by a grower, wherein, in the step of identifying the correspondence, the computer contracts a first mathematical model representing 1) a primary correspondence between i) a set of the use condition and the cultivation condition and ii) the state of growth of the crop plant during the cultivation period, based on the first information, the third information, and the fourth information of the each grower, and constructs a second mathematical model representing 2) a secondary correspondence between the state of growth of the crop plant during the cultivation period and the outcome based on the second information and the fourth information of the each grower, thereby constructing a cultivation assistance model representing the correspondence by integrating the first mathematical model representing the primary correspondence and the mathematical model representing the secondary correspondence, and wherein, when the designation of the outcome is accepted, in the step of deriving the use condition, the computer derives the use condition corresponding to the cultivation condition represented by the third information of a grower that performed the designation of the outcome and also corresponding to the outcome designated by inputting the outcome designated and the cultivation condition represented by the third information of the grower that performed designation of the outcome to the cultivation assistance model.

\* \* \* \* \*